United States Patent [19]

Curfman

[11] Patent Number: 4,824,628
[45] Date of Patent: Apr. 25, 1989

[54] METHOD OF MAKING AN EPOXY MOLD

[75] Inventor: William A. Curfman, Indianapolis, Ind.

[73] Assignee: General Motors Corporation, Detroit, Mich.

[21] Appl. No.: 145,944

[22] Filed: Jan. 20, 1988

[51] Int. Cl.$^4$ .................... B29C 33/38; B29C 39/10
[52] U.S. Cl. .................................... 264/225; 264/277;
     264/278; 249/134; 249/165; 29/458; 29/460;
     29/526.1; 425/179
[58] Field of Search ............... 264/25, 219, 220, 225,
     264/226, 227, 271.1, 274, 275, 277, 278, 279.1,
     279; 425/179; 249/134, 165, 166, 168; 29/526
     R, 458, 460

[56] References Cited

U.S. PATENT DOCUMENTS

| | | | |
|---|---|---|---|
| 2,039,105 | 4/1936 | Naery | 264/226 |
| 3,075,265 | 1/1963 | Stumph et al. | 249/142 |
| 4,285,902 | 8/1981 | Braverman | 264/229 |
| 4,601,867 | 7/1986 | Martell et al. | 264/227 |

Primary Examiner—James Lowe
Assistant Examiner—Jeremiah F. Durkin, II
Attorney, Agent, or Firm—Saul Schwartz

[57] ABSTRACT

A method of making epoxy molds for making wax patterns have metal posts disposed therein which transfer compressive forces between the force applying members of the press in which the molds are located. The metal cylinders in the upper mold section have right hand screw threaded axial bores and the metal cylinders in the lower mold section have left hand screw threaded axial bores. The metal cylinders are connected together when the mold sections are poured by connecting studs which have oppositely threaded ends. After the epoxy cures, screw drivers are inserted into the threaded bores from outside the molds and the connecting studs are turned in a direction which causes the mold sections to separate in turnbuckle fashion. Accurate alignment of the inner end faces of the cylinders in the parting surfaces of the mold sections is achieved by having the metal posts connected during the mold pouring steps.

1 Claim, 4 Drawing Sheets

METHOD OF MAKING AN EPOXY MOLD

FIELD OF THE INVENTION

This invention relates to epoxy molds for casting wax patterns for use in metal casting processes and to methods of making epoxy molds.

BACKGROUND OF THE INVENTION

Wax patterns for some metal casting processes are, themselves, typically made by pouring hot wax into a chamber defined between upper and lower sections of molds made from a curable plastic material commonly referred to as epoxy. External force applied to the mold sections to hold them together against separating forces produced by the wax must be carefully controlled because the epoxy from which the mold sections are fabricated usually cannot withstand more than moderate compressive forces. Such careful control may require relatively expensive press controls for the press which moves the mold sections between open and closed positions or may require time consuming shimming of separating blocks between the force applying members of the press. A wax pattern mold and method according to this invention achieves protection for the epoxy mold sections without elaborate press controls and without shimming.

SUMMARY OF THE INVENTION

This invention is a new and improved epoxy mold for wax patterns and a new and improved method of making the epoxy mold. The mold according to this invention has first and second mold sections which meet at planar parting surfaces on each, cavities in the parting surfaces of each of the mold sections which register in a closed position of the mold and define therebetween a pattern chamber for hot wax, and a plurality of force transfer members in the form of cylindrical metal posts embedded in the epoxy of each of the mold sections and engageable upon each other at the parting surfaces of the mold sections and by the press holding the mold sections together, the posts transferring compressive forces directly between the force applying elements of the press independently of the epoxy. In a preferred embodiment of the epoxy mold according to this invention, each of the metal posts has a planar inner end face in the parting surface of the corresponding one of the mold sections and an outer end face engaged by the force applying members of the press. The posts in one of the mold sections have right handed screw threaded axial bores and posts in the other of the mold sections have left hand screw threaded axial bores therein, the bores receiving oppositely screw threaded ends of connecting studs during mold fabrication which align the posts and locate the inner end faces thereof in the parting surfaces of the mold sections.

In the new and improved method according to this invention, the epoxy for the first mold section is poured into a chamber wherein the posts are located with their inner end faces against a bottom of the chamber so that when the cured epoxy is removed from the pouring chamber the mold parting surface and the inner end faces of the posts are coplanar. Thereafter, the first mold section is inverted and the right hand threaded ends of the connecting studs are threaded into the axial bores through the inner end faces of the posts embedded in the first mold section while the left hand screw threaded posts are threaded onto left hand threads on the distal ends of the connecting studs so that the posts are rigidly connected in aligned pairs which abut at their inner end faces. Then, another pouring chamber is formed around the left hand screw threaded posts and epoxy is poured therein to embed the left hand screw threaded posts in epoxy. When the second poured epoxy cures, the mold sections are separated by inserting screw drivers into the axial bores in the posts through exposed outer end faces, the screw drivers engaging slots on the connecting studs to turn the studs in a direction which separates the mold sections in turnbuckle fashion.

DESCRIPTION OF PREFERRED EMBODIMENT

Figure 1:
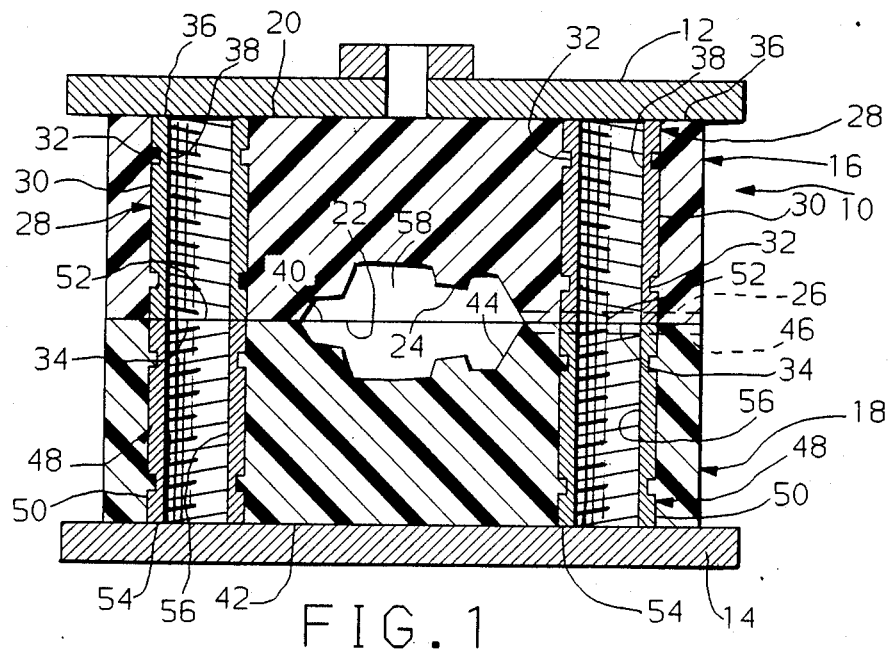
FIG. 1 is a schematic sectional view of an epoxy mold according to this invention showing the mold in a closed position.
Figure 2:
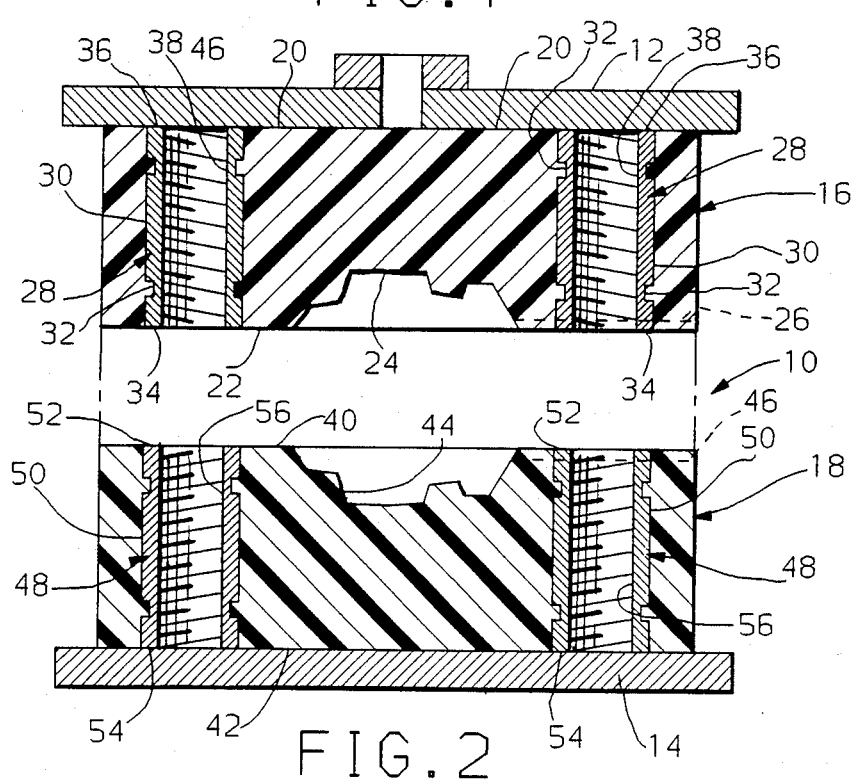
FIG. 2 is similar to FIG. 1 but showing the mold in an open position.

Referring to FIGS. 1 and 2 of the drawings, a schematically illustrated mold 10 according to this invention is disposed between a schematically illustrated upper plate 12 and a schematically illustrated lower plate 14. The plates 12 and 14 are representative elements of a press or like machine which moves the plates toward and away from each other and which exerts, through the plates, a compressive force on a body captured therebetween.

The mold 10 includes and upper or first mold section 16 and a lower or second mold section 18. The upper mold section 16 is fabricated from an epoxy or thermoset plastic material and has an upper surface 20 juxtaposed the upper plate 12 and a planar lower or parting surface 22. A suitable epoxy is marketed under the name THERMOSET 200 by Thermoset Plastics, Inc., 5101 E. 56th Street, P 0. Box 20902, Indianapolis, Ind. 46220-0902.

A cavity 24 which opens through the parting surface 22 is formed in the first mold section and duplicates the outer surface of substantially the upper half of the wax pattern to be produced by the mold 10. A groove 26, FIG. 1, in the parting surface 22 extends from the cavity 24 to an outside wall of the first mold section 16. The first mold section 16 is connected to the upper plate 12 through conventional means, not shown, which carry the mold section up and down with the plate 12.

Figure 6A:
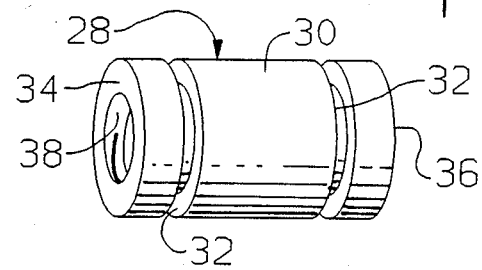
FIGS. 6A and 6B are perspective views of the posts and the connecting studs of the epoxy mold according to this invention.

As seen best in FIGS. 1, 2 and 6A, the first mold section 16 further includes a plurality of first force transfer elements 28 in the form of cylindrical metal, preferably aluminum, posts embedded in and/or mechanically locked to the epoxy of the first mold section. Each post 28 has a cylindrical outer surface 30 with spaced grooves 32 therein, a planar inner end face 34 and a planar outer end face 36. The inner end faces 34 of the posts 28 are disposed in the plane of the parting surface 22 and the outer end faces 36 are disposed at least slightly outside of the upper surface 20 of the mold section so that the plate 12 bears directly on the posts 28 but not on the epoxy therebetween. Each post has an axial bore 38 extending therethrough between the inner and outer end faces 34 and 36. The bores 38 are internally threaded with right hand screw threads.

The second or lower mold section 18 is also fabricated from epoxy and has a planar upper or parting surface 40 facing the parting surface 22 on the upper mold section and a lower surface 42 juxtaposed the plate 14. A cavity 44 which opens through the parting surface 40 is formed in the second mold section and duplicates the outer surface of substantially the lower half of the wax pattern to be produced by the mold 10. A groove 46 in the parting surface 40 extends from the cavity 44 to an outside wall of the second mold section 14. The second mold section 18 is connected to the lower plate 14 through conventional means, not shown, like the means connecting the first mold section 16 to the upper plate 12.

As seen best in FIGS. 1 and 2, the second mold section 18 further includes a plurality of posts 48 embedded in and/or mechanically locked to the epoxy of the second mold section. The posts 48 are similar to the posts 28 in the first mold section 16. Each post 48 has a cylindrical outer surface 50 with spaced grooves therein, a planar inner end face 52 and a planar outer end face 54. The inner end faces 52 of the posts 48 are disposed in the plane of the parting surface 40 and the outer end faces 54 are disposed at least slightly outside of the lower surface 42 of the mold section so the plate 14 bears directly on the posts 48 but not on the epoxy therebetween. Each post has an axial bore 56 extending therethrough between the inner and outer end faces 52 and 54. The bores 56 are internally threaded with left hand screw threads.

The posts 28 in the first mold section 16 are aligned with respective ones of the posts 48 in the second mold section 18. Likewise, the cavity 24 and the groove 26 in the parting surface of the first mold section 16 are aligned with the cavity 44 and the groove 46 in the parting surface of the second mold section 18. In a closed position of the mold 10, FIG. 1, the first and second mold sections 16 and 18 meet at the parting surfaces 22 and 40, respectively, whereby the cavities 24 and 44 define a closed pattern chamber 58 accessible only through the passage defined by the grooves 26 and 46.

In operation, the plates 12 and 14 have first or open positions, FIG. 2, relative to each other wherein the first and second mold sections are separated by a distance sufficient to permit withdrawal of the wax patterns formed in the mold 10. After a pattern is removed from the mold, the press is actuated to move the plates 12 and 14 toward each other. Of course, only one of the plates needs to move for relative closing to occur. The plates move toward each other until the inner end faces 34 of the posts 28 in the first mold section 16 engage the inner end faces 52 of corresponding ones of the posts 48 in the second mold section 18. At that instant the closed position of the mold 10 is defined. Further relative closing of the plates beyond the closed position is foreclosed by the posts 28 and 48 which transfer compressive forces directly between the plates 12 and 14 independently of the epoxy in which they are embedded.

Because the inner end faces of the posts 28 and 48 are in the planes of the parting surfaces 22 and 40, respectively, the closed position of the mold 10 is also characterized by surface to surface contact between the parting surfaces. Accordingly, in the closed position of the mold, the pattern chamber 58 defined by the cavities is closed and accessible only through the passage defined by the aligned grooves 26 and 46.

With the mold 10 in the closed position, hot wax is introduced into the pattern chamber 58 through the passage defined by the grooves 26 and 46. The wax exerts forces on the first and second mold sections 16 and 18 tending to separate them at the parting surfaces 22 and 40. However, because the posts 28 and 48 are embedded in the epoxy of the mold sections and because the outer end faces of the posts abut the plates 12 and 14, the mold remains closed. When the wax solidifies, the press is actuated to move the plates in relative opening directions until the open position is achieved. Thereafter, the wax pattern is removed and the cycle is repeated.

It is, of course, essential that the inner end faces 34 and 52 of the posts 28 and 48, respectively, be located substantially precisely in the planes of the respective parting surfaces 22 and 40. Otherwise, compressive forces will be transferred to the epoxy material of the mold sections. The method according to this invention of fabricating the mold 10 achieves the requisite location of the inner end faces and represents an important feature of this invention.

Figure 3:
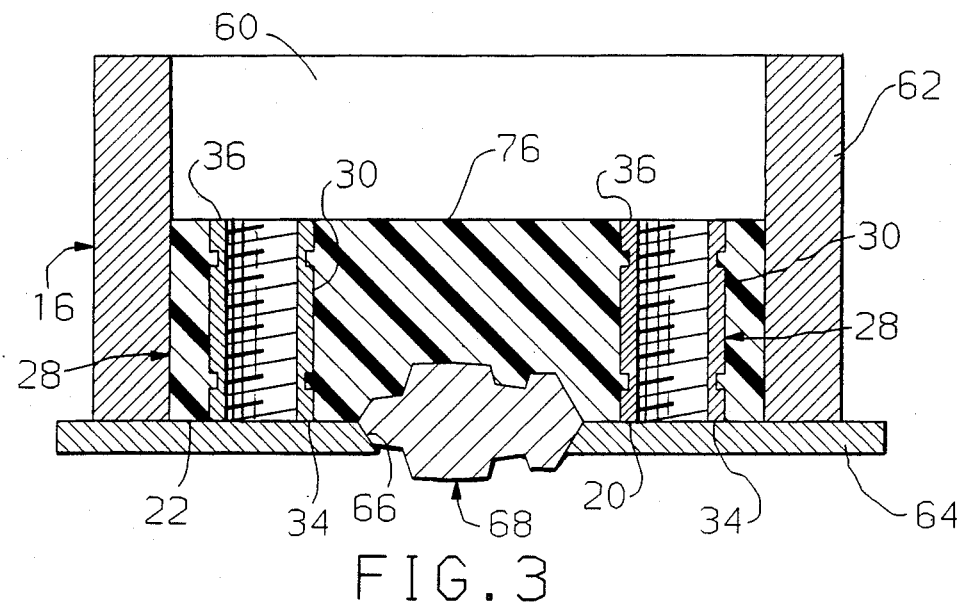
FIG. 3 is a schematic representation of a first step in the method of making an epoxy mold according to this invention.
Figure 4:
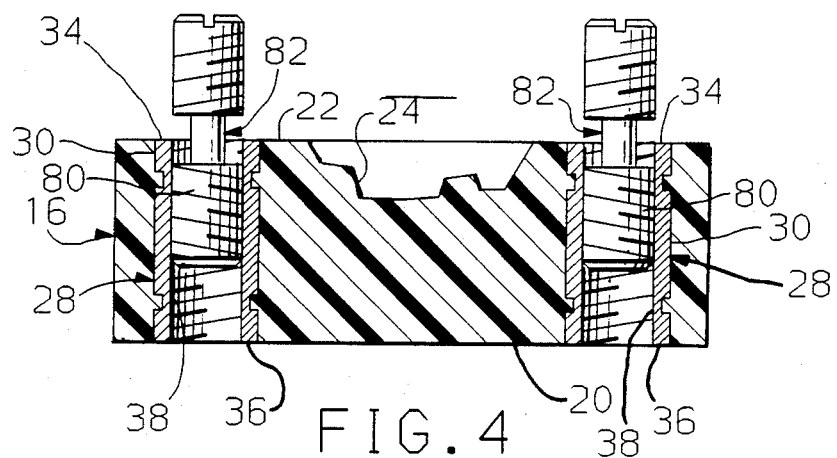
FIG. 4 is a schematic representation of a later step in the method of making an epoxy mold according to this invention.
Figure 7:
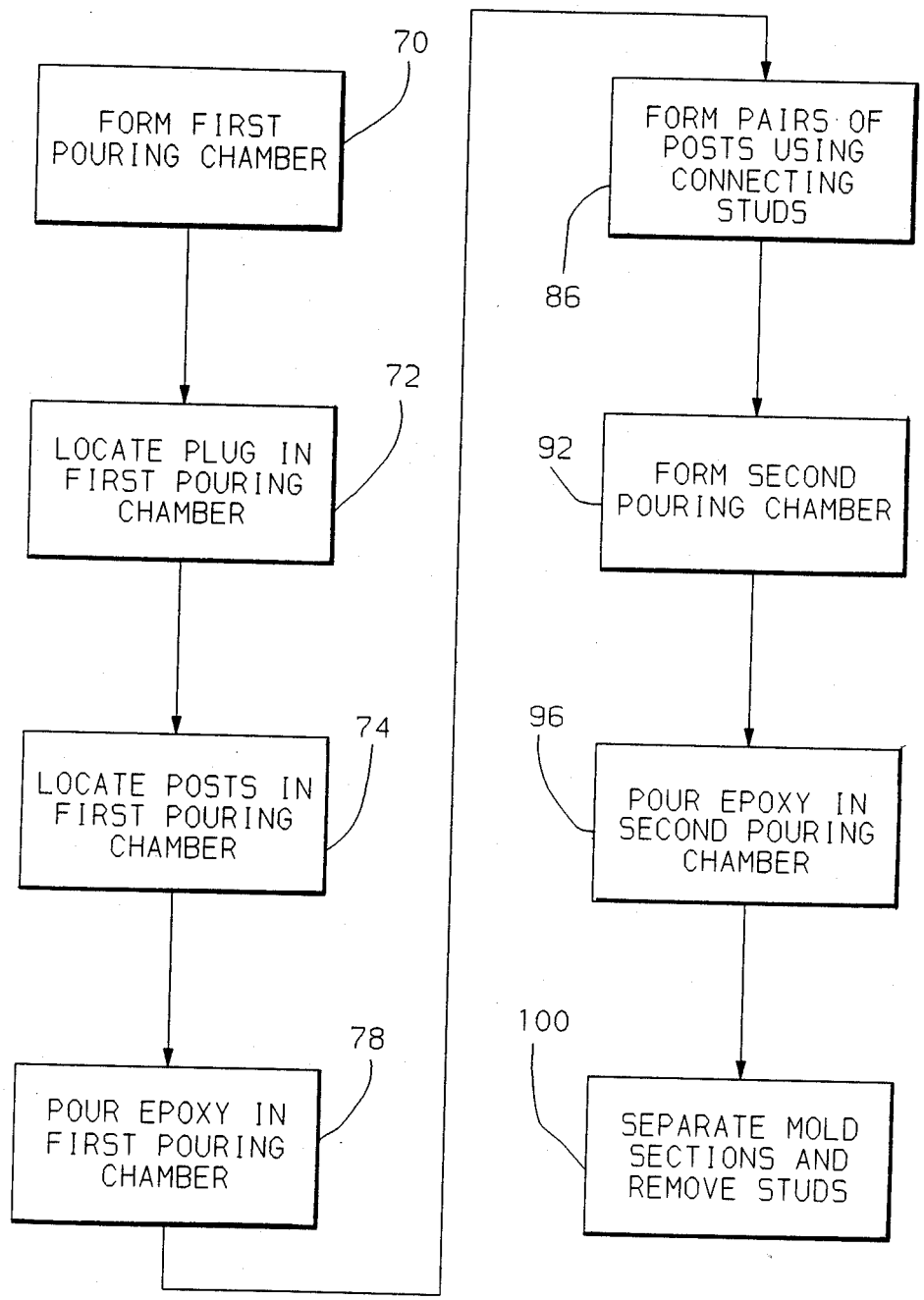
FIG. 7 is a block diagram depicting the steps in the method of making an epoxy mold according to this invention.

Referring to FIG. 3, in a first step in the method of fabricating the mold 10, a first pouring chamber 60 is defined within the confines of a first closure member 62 and above a plate 64. The chamber 60 can be cylindrical, square or any other convenient shape. The surface of the plate 64 facing the chamber 60 defines a planar bottom of the latter and may have an aperture 66 therein which closely receives a solid plug 68 representing the shape of the wax pattern to be produced by the mold 10. Generally the upper half of the plug 68 projects above the plane of the bottom of the pouring chamber. The blocks 70 and 72, FIG. 7, represent the steps of forming the chamber 60 and locating the plug 68 therein.

After the plug 68 is located in the bottom of the pouring chamber, several posts 28 are positioned in the pouring chamber around the plug. The posts 28 have their respective inner end faces 34 directly engaging the plate 64 so that the inner end faces are substantially exactly in the plane of the bottom of the pouring chamber. Since the outer end faces of the posts 28 are accessible throughout the fabrication of the mold sections, mechanical gripping devices, not shown, may be used to maintain the positions of the posts within the pouring chamber 60. The block 74, FIG. 7, represents the step of positioning the posts in the pouring chamber 60.

In the next step, uncured epoxy is poured into the pouring chamber 60 to a depth represented schematically by phantom line 76, FIG. 3. The epoxy is then allowed to cure or harden. The adhesion between the epoxy and the outer surfaces of the posts, plus the mechanical connection therebetween defined at the grooves 32, unitize the cured epoxy and the posts. A suitable metal for the posts 28 is aluminum and a suitable epoxy is the aforesaid THERMOSET 200 Epoxy Casting Resin marketed by Thermoset Plastics, Inc., 5101 E. 56th Street, P.O. Box 20902, Indianapolis, Ind. 46220-09022. The block 78, FIG. 7, represents the step of filling the pouring chamber 60 with epoxy.

After the epoxy cures, the first mold section thus formed is removed from the pouring chamber 60 and inverted. The upwardly facing parting surface 22 of the mold section 16 is the surface which was exposed to the planar bottom of the pouring chamber and is substantially coplanar with the inner end faces 34 of the posts 28 since the inner end faces abutted the bottom of the pouring chamber 60 when the epoxy was poured.

Figure 6B:
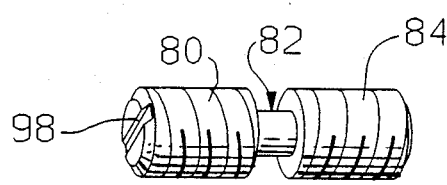

In the next step in the method according to this invention, a right hand screw threaded end 80 of a connecting stud 82, FIG. 6B, is threaded into each of right hand threaded bores 38 in the posts 28 through the inner end faces 34. A left hand screw threaded end 84 of each of the studs 82 projects above the parting surface 22 and thereafter threadedly receives the left hand screw threaded bore of one of the posts 48. The posts 48 are threaded onto the studs 82 until the inner end faces 52 thereof abut the inner end faces 34 of the corresponding posts 28 to define rigidly coupled pairs of posts. The block 86, FIG. 7, represents the step of connecting the posts 28 and 48 through connecting studs 82 to form rigid pairs abutting at their inner end faces.

Figure 5:
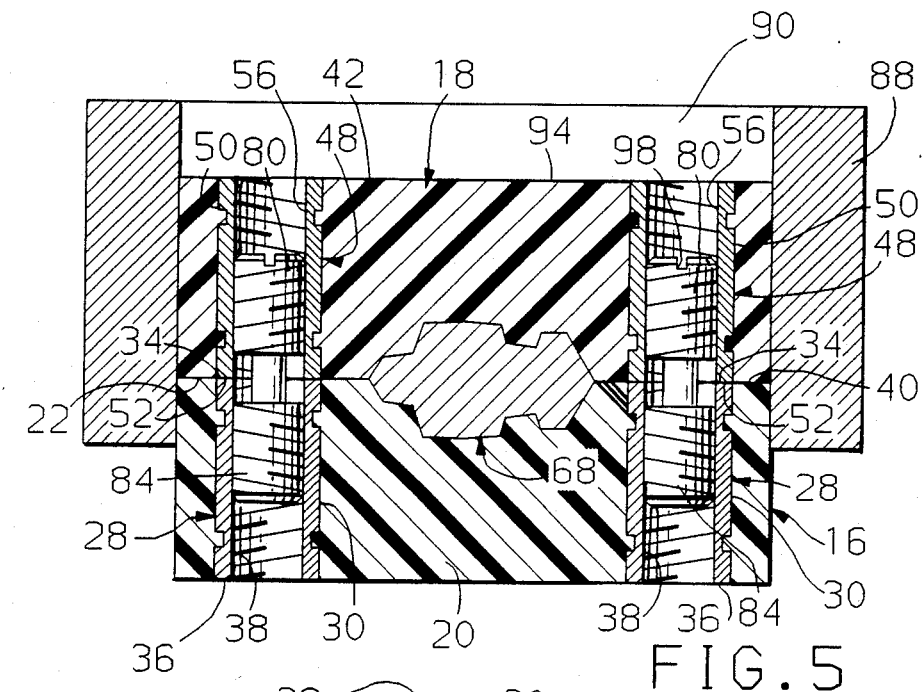
FIG. 5 is a schematic representation of a still later step in the method of making an epoxy mold according to this invention.

As seen best in FIG. 5, a second closure member 88 is positioned around the inverted first mold section 16 to define therewithin a second pouring chamber 90. The bottom of the second pouring chamber 90 is defined by the parting surface 22 of the inverted first mold section 16. Substantially the lower half of the plug 68 projects above the parting surface 22 into the second pouring chamber. The block 92, FIG. 7, represents the step of forming the second pouring chamber 90 adjacent the parting surface 22.

The same uncured epoxy used to form the first mold section 16 is poured into the second pouring chamber 90 to a depth schematically represented by phantom line 94, FIG. 5. The epoxy is then allowed to cure. The adhesion between the epoxy and the several posts 48, plus the mechanical bonds therebetween defined at the grooves, unitize the epoxy and the posts. The block 96, FIG. 7, represents the step of pouring the epoxy into the second pouring chamber 90.

The second closure member 88 is removed to expose the second mold section 18 thus formed. At this stage the second mold section is rigidly coupled to the first mold section 16 by the connecting studs 82. The mold sections are conveniently separated in turnbuckle fashion by screw drivers or like implements inserted into the threaded bores of the posts 28 or 48. For example, screw drivers, not shown, are inserted into the bores 56 through the outer end faces 54 until the blades thereof engage a slot 98, FIG. 6B, in the end of the corresponding connecting stud 82. When the screw drivers are thereafter turned in an appropriate direction, the connecting studs operate in turnbuckle fashion to relatively separate the first mold section from the second mold section until the mold sections are separated by a distance sufficient to remove the studs from between the parting surfaces 22 and 40. The block 100, FIG. 7, represents the step of separating the mold sections 16 and 18 and removing the studs.

Since the parting surface 22 of the first mold section 16 defines the bottom of the second pouring chamber 90, the parting surface 40 of the second mold section precisely matches the parting surface 22 of the first mold section 16. In addition, the inner end faces 52 of the posts 48 are substantially exactly positioned in the planar parting surface 40 because of their abutment against the inner end faces 34 of the posts 28 when the epoxy was poured into the second pouring chamber. Accordingly, each time the mold sections are brought together, the parting surfaces 22 and 40 meet with sufficient closeness to seal the pattern cavity against wax escape while the metal posts prevent further compression of the first mold section against the second mold section.

The embodiments of the invention in which an exclusive property or privilege is claimed are defined as follows:

1. A method of fabricating a wax pattern casting mold for disposition between pressure application surfaces comprising the steps of:

forming a first pouring chamber having a planar bottom surface, forming a pattern plug in said first pouring chamber extending from said bottom surface into said first pouring chamber, forming a plurality of first force transfer members each having a planar inner end face and an outer end face and an axial bore extending between said inner and said outer end faces, forming right hand screw threads over at least a portion of the length of said axial bore in each of said first force transfer members, locating each of said first force transfer members in said first pouring chamber remote from said pattern plug with said inner end face thereof abutting said bottom surface, pouring curable plastic material into said first pouring chamber around said pattern plug and around each of said first force transfer members and allowing said curable plastic material to cure, removing said cured plastic material from said pouring chamber, said removed cured plastic material forming a first mold section having a planar parting surface corresponding to said bottom surface of said first pouring chamber in which are disposed said inner end faces of each of said force transfer members, forming a plurality of connecting studs each having a right hand screw thread at one end and an a left hand screw thread at the other end, threading said right hand screw thread of each of said connecting studs into the right hand screw threads of respective ones of said first force transfer members so that said connecting studs extend perpendicular to said first mold section parting surface, forming a plurality of second force transfer members each having a planar inner end face and an outer end face and an axial bore extending between said inner and said outer end faces, forming left hand screw threads over at least a portion of the length of said axial bore in each of said second force transfer members, threading said left hand screw threads of each of said second force transfer members onto said left hand screw threads on respective ones of said connecting studs until said inner end face of each of said second force transfer members abuts said inner end face of the corresponding one of said first force transfer members, forming a second pouring chamber around said second force transfer members with said first mold section parting surface defining a bottom surface of said second pouring chamber, pouring curable plastic material into said second pouring chamber around each of said second force transfer members and allowing said curable plastic material to cure, removing said second pouring chamber from around said cured plastic material, said cured plastic material forming a second mold section attached to said first mold section by said connecting studs and having a planar parting surface abutting said first mold section parting surface, and removing each of said connecting studs from said first and said second mold sections by unthreading said connecting studs in turnbuckle fashion to separate said first and said second mold sections.

* * * * *